United States Patent
Salter et al.

(10) Patent No.: US 9,840,191 B1
(45) Date of Patent: Dec. 12, 2017

(54) VEHICLE LAMP ASSEMBLY

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/207,857

(22) Filed: Jul. 12, 2016

(51) Int. Cl.
*B60Q 1/26* (2006.01)
*B60R 1/12* (2006.01)
*B60Q 1/32* (2006.01)

(52) U.S. Cl.
CPC ........... *B60Q 1/323* (2013.01); *B60Q 1/2661* (2013.01)

(58) Field of Classification Search
CPC .......... B60Q 1/00; B60Q 1/26; B60Q 1/2619; B60Q 1/2661; B60Q 1/2665; B60Q 1/2696; B60Q 1/32; B60Q 1/323
USPC ................. 362/487, 494, 509–510, 543–545
See application file for complete search history.

(56) References Cited

U.S. PATENT DOCUMENTS

| | | | |
|---|---|---|---|
| 2,430,232 A | 11/1947 | Lynch | |
| 2,486,859 A | 11/1949 | Meijer et al. | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,260,988 B1 | 7/2001 | Misawa et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A lamp assembly is provided herein. The lamp assembly includes first and second light sources disposed in a housing. The first and second light sources emit light at varied wavelengths. A badge is disposed on a vehicle and is operably coupled with the first light source. A photoluminescent structure is disposed on the badge and is configured to luminesce in response to receiving an excitation light emitted by the first light source.

20 Claims, 7 Drawing Sheets

(56) References Cited

U.S. PATENT DOCUMENTS

| | | |
|---|---|---|
| 7,354,182 B2 | 4/2008 | Bartels |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,236,199 B2 | 8/2012 | Mahany et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,434,297 B2 | 9/2016 | Salter et al. |
| 9,442,888 B2 | 9/2016 | Stanfield et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Sytert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gaily et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0175057 A1 | 6/2015 | Salter et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| KR | 100647239 B1 | 11/2006 |
| WO | 03034378 A1 | 4/2003 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

VEHICLE LAMP ASSEMBLY

FIELD OF THE INVENTION

The present disclosure generally relates to vehicle lamp assemblies, and more particularly, to vehicle lamp assemblies employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lamp assembly is disclosed. The lamp assembly includes first and second light sources disposed in a housing. The first and second light sources emit light at varied wavelengths. A badge is disposed on a vehicle and is operably coupled with the first light source. A photoluminescent structure is disposed on the badge and is configured to luminesce in response to receiving an excitation light emitted by the first light source.

According to another aspect of the present invention, a vehicle mirror assembly is disclosed. The vehicle mirror assembly includes a first light source disposed within a first housing. A second light source is disposed with a second housing. A direction of illumination from the second light source is offset from the first light source. A vehicle feature has a first photoluminescent structure disposed therein and is configured to luminesce in response to an excitation light emitted by the first light source.

According to yet another aspect of the present invention, a vehicle lamp assembly is disclosed. The vehicle lamp assembly includes a light source disposed on a vehicle. A vehicle feature is operably coupled with the light source. A photoluminescent structure is disposed on the vehicle feature and is configured to luminesce in response to receiving an excitation light from the light source. The light source emits intermittent emissions of the excitation light at the feature when the vehicle is in a parked state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
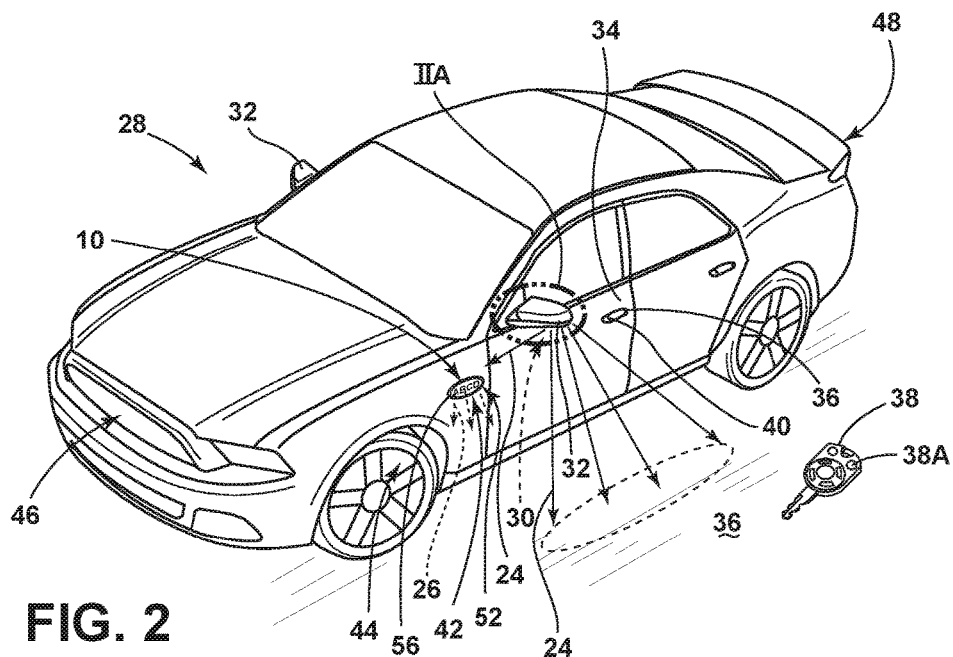
FIG. 2 is a perspective view of an automotive vehicle employing a lamp assembly in an exterior side view mirror of a vehicle, according to one embodiment.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a reflective assembly for a vehicle. The lamp assembly may advantageously employ one or more photoluminescent structures that illuminate in response to pre-defined events. The one or more photoluminescent structures may be configured to receive an excitation light and re-emit a converted light at a different wavelength typically found in the visible wavelength spectrum. The converted light may be emitted from the photoluminescent structure for a substantial amount of time once the excitation light is removed.

Figure 1A:
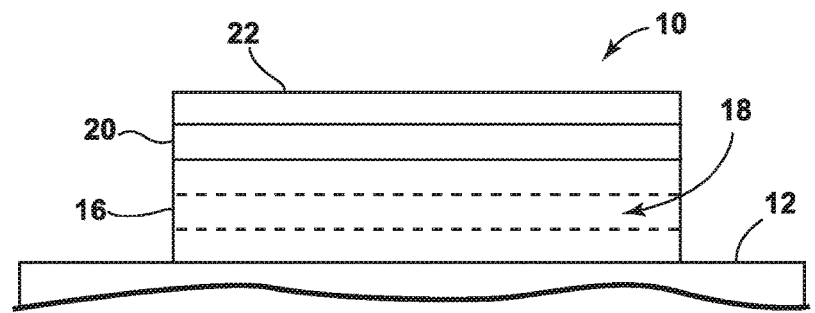
FIG. 1A is a side view of a photoluminescent structure rendered as a coating for use in a trim assembly according to one embodiment.
Figure 1B:
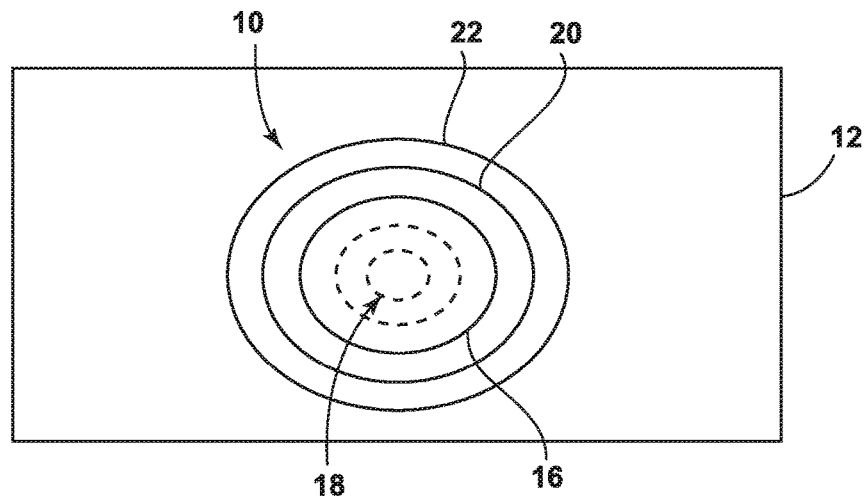
FIG. 1B is a top view of a photoluminescent structure rendered as a discrete particle according to one embodiment.
Figure 1C:
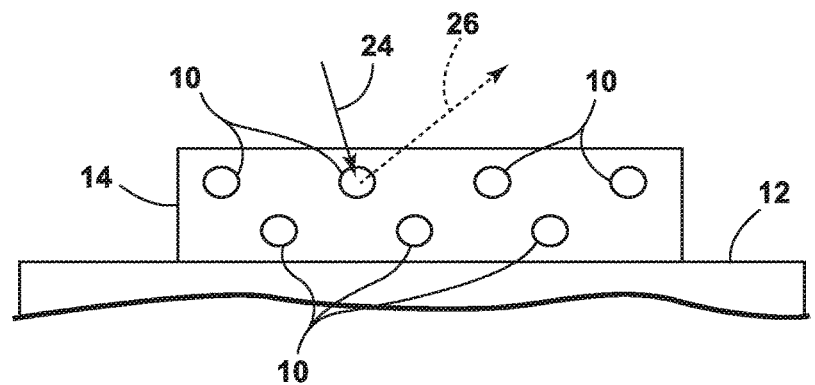
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 54 (FIG. 2A) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

Figure 2A:
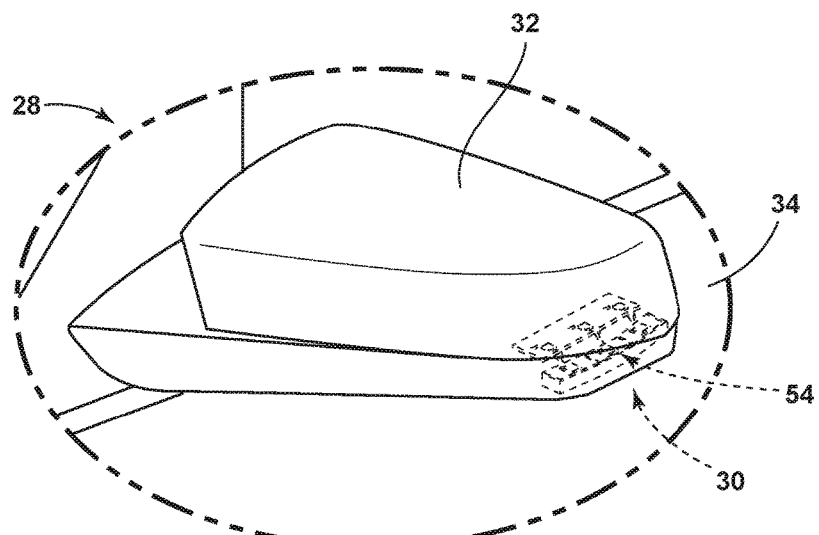
FIG. 2A is an enlarged view of section IIA illustrating the exterior side view mirror with a plurality of light sources disposed within the lamp assembly.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 54 (FIG. 2A). According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 54). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 54 that emits the excitation light 24, including, but not limited to, natural light sources (e.g., the sun) and/or any artificial light source 54. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^{3}$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSIS- TENT LUMINESCENCE," all of which are incorporated herein by reference in their entirety.

Referring to FIGS. 2 and 2A, an automotive vehicle 28 is generally illustrated employing a lamp assembly 30, according to one embodiment. The vehicle 28 shown is one example of a passenger vehicle 28 having a pair of exterior rearview mirrors 32 mounted on opposite lateral sides of the vehicle 28 generally near the front side of the front passenger doors 34, as is generally known in the art. Passenger doors 34 each include a handle 36 with a latch mechanism to enable a user to engage and unlatch the latch mechanism to open the door 34 for access to enter and exit the vehicle 28. A remote key fob 38 is shown which may be operated by a user to activate various features including door lock and unlock functions. The handle 36 is shown including a proximity sensor 40, such as a capacitive sensor, for sensing the hand of the user in close proximity to the handle 36.

A badge 42 is generally shown mounted on a side portion 44 of the vehicle 28. In other embodiments, the badge 42 may be located elsewhere, such as, but not limited to, other locations of a front portion 46, the side portion 44, or a rear portion 48 of the vehicle 28. Alternatively, the badge 42 may be disposed inside the vehicle 28. The badge 42 may be configured as an insignia that is presented as an identifying mark of a vehicle manufacturer, or any other desired information, and includes a front viewable portion 50 that is generally prominently displayed on the vehicle 28. In the presently illustrated embodiment, the badge 42 is located on a side fender 52 of the vehicle 28, thus allowing the badge 42 to be readily viewed by an observer looking at the side portion 44 of the vehicle 28. As will be described below in greater detail, one or more light sources 54A, 54B, 54C may be disposed within the badge 42 and may illuminate in a plurality of manners to provide a distinct styling element to the vehicle 28.

The lamp assembly 30 is shown installed on an exterior rearward facing side view mirror 32, generally in a position configured to project excitation light 24 towards the badge 42 and/or onto the ground surface 56 adjacent to a passenger side door 34 of the vehicle 28. Accordingly, the lamp assembly 30 may include the one or more light sources 54A, 54B, 54C within a housing of the mirror 32. In the embodiment shown, three light sources 54A, 54B, 54C are configured in a linear array, each oriented to illuminate a different location on the vehicle 28 and/or the ground surface 56. To illuminate different locations, the three light sources 54A, 54B, 54C have axes of illumination that are offset from one another. While three light sources 54A, 54B, 54C are shown and described herein as part of the lamp assembly 30, it will be appreciated that one or more light sources 54A, 54B, 54C may be employed in various configurations and orientations. It will further be appreciated that the light sources 54A, 54B, 54C may be located at different locations on the vehicle 28 such as in the vehicle door handle 36, the door 34 itself, a side fender 52, a bumper, a roof rail or other locations sufficient to project excitation light 24 towards a desired location.

The lamp assembly 30 is controlled by a controller 64 (FIG. 5) to simultaneously or independently activate the one or more light sources 54A, 54B, 54C. The one or more light sources 54A, 54B, 54C may emit excitation light 24 that causes the photoluminescent structure within and/or on the badge 42 to luminesce. The luminescence exhibited by the badge 42 may provide one or more distinct lighting functions. For example, the illumination may offer a unique, substantially uniform, and/or attractive viewing experience that may be difficult to duplicate through non-photoluminescent means.

The lamp assembly 30 may be activated in response to a user activating the door unlock switch 38A on the key fob 38, when the user is within signal communication range of the vehicle 28. Upon activation of the door unlock switch 38A or button, the lamp assembly 30 is turned on to direct excitation light 24 towards the photoluminescent structure, which luminesces in response to receiving the excitation light 24. The lamp assembly 30 may remain on for a predetermined time period, such as two minutes, and may be turned off prior to the predetermined time period when a user's hand is detected by the proximity sensor 40 in close proximity to or actuating the door handle 36. Accordingly, the luminescence may provide a distinct styling feature on the vehicle 28 while additional light sources 54B, 54C may serve as a puddle lamp to illuminate the ground surface 56 adjacent to the vehicle door 34 to enable the user to approach and access the vehicle 28 and view the ground surface 56 proximate thereto.

Figure 3:
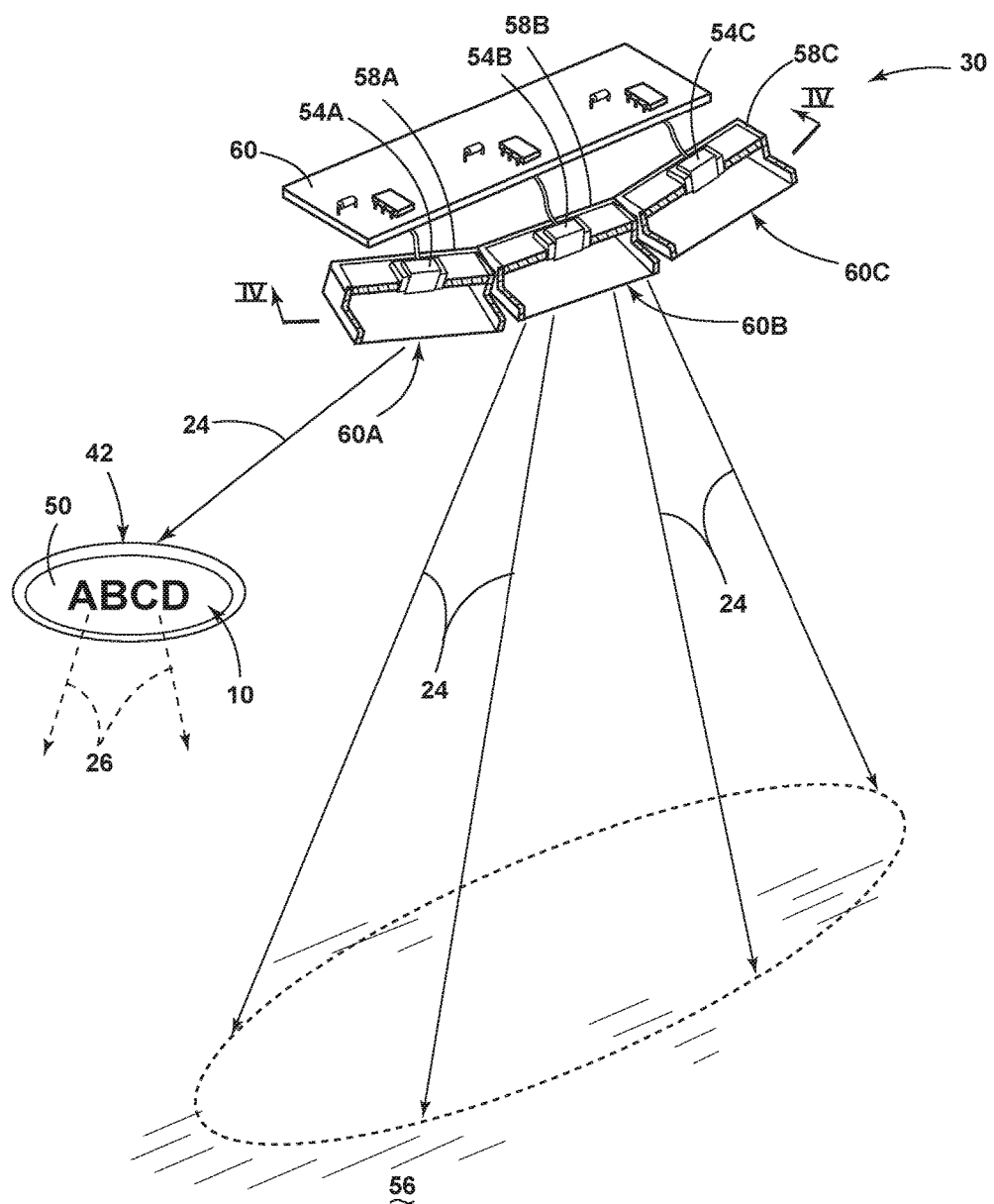
FIG. 3 is an enlarged view of the lamp assembly illustrating the light sources illuminating a badge and the ground surface simultaneously, according to one embodiment.

Referring to FIG. 3, the lamp assembly 30 is further illustrated having three light sources 54A, 54B, 54C for illuminating the badge 42 and/or the ground surface 56. The lamp assembly 30 includes a first light source 54A, a second light source 54B, and a third light source 54C, all shown arranged in a linear array and slightly angled relative to one another so as to provide light illumination onto one or more desired locations.

The light sources 54A, 54B, 54C may include any form of light source. For example, fluorescent lighting, light emitting diodes (LEDs), organic LEDs (OLEDs), polymer LEDs (PLEDs), solid-state lighting, or any other form of lighting configured to emit light may be utilized. According to one embodiment, some or all of the light sources 54A, 54B, 54C may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

Each of the light sources 54A, 54B, 54C may include a housing 58A, 58B, 58C. Optics may be arranged within light output windows 60A, 60B, 60C of the corresponding light sources 54A, 54B, 54C, respectively, such that excitation light 24 output by the light sources 54A, 54B, 54C is directed towards the desired location. The lamp assembly 30 may include a printed circuit board (PCB) 62 containing the controller 64 having control circuitry including LED drive circuitry for controlling activation and deactivation of the light sources 54A, 54B, 54C. The printed circuit board 62 may be any type of circuit board including, but not limited to, any flexible PCB and/or rigid PCB. In embodiments in which a rigid PCB is implemented, the optics may be configured to direct the excitation light 24 and/or the converted light 26 towards a desired vehicle feature and/or location proximate to the vehicle 28.

In operation, any of the light sources 54A, 54B, 54C may be configured to emit excitation light 24 towards the photoluminescent structure. The photoluminescent structure, which may be disposed on the badge 42, luminesces in response to receiving the excitation light 24. The wavelength of the excitation light 24 may differ in length from that of the converted light 26 that is emitted from the photoluminescent structure 10.

In some embodiments, some of the light sources (e.g., light source 54A) may emit non-visible excitation light 24 while additional light sources within the lamp assembly 30 (e.g., light source 54B) may emit light in the visible spectrum. Accordingly, some embodiments of the lamp assembly 30 described herein, may not include the photoluminescent structures 10.

Figure 4:
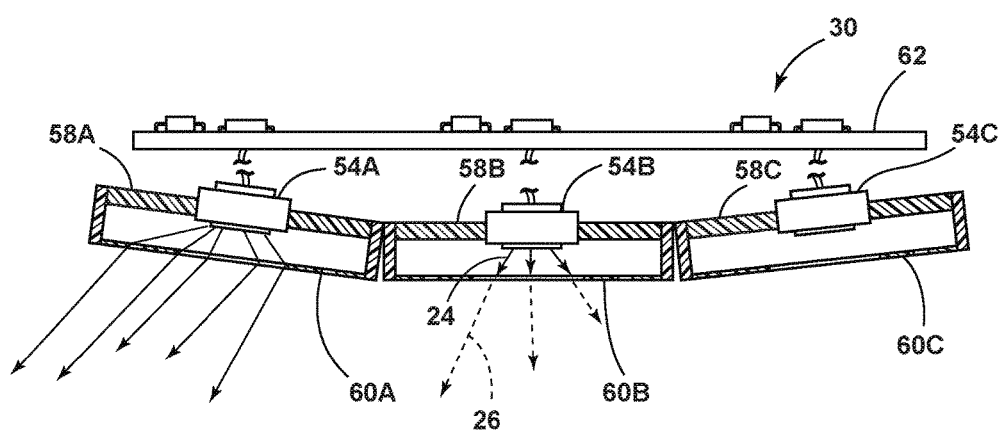
FIG. 4 is a cross-sectional view taken through line IV-IV of FIG. 3 further illustrating the light sources, according to one embodiment.

Referring to FIG. 4, some of the windows (e.g., 60B) of the lamp assembly 30 may have the photoluminescent structure therein and/or thereon for converting excitation light 24 to a converted light 26. In any event, the windows 60A, 60B, 60C may be light transmissive such that light from each respective light source 54A, 54B, 54C may pass therethrough.

As illustrated in FIG. 4, the forward window 60A is configured to direct excitation light 24 towards a first feature of the vehicle 28, such as the badge 42. The middle window 60B is configured to direct excitation light 24 and/or converted light 26 towards an area proximately disposed to the vehicle 28 and may include a photoluminescent structure on the window. The rearward window 60C may be directed towards a second feature of the vehicle 28, such as the vehicle door handle 36. The vehicle door handle 36 may have an additional photoluminescent structure thereon that luminesces upon receiving excitation light 24 from the third light source 54C. It will be appreciated, however, that the lamp assembly 30 may have any number of light sources 54A, 54B, 54C directed at any feature of the vehicle 28 and/or any area surrounding the vehicle 28. Moreover, each light source 54A, 54B, 54C may illuminate independently, or in conjunction with one another, without departing from the scope of the present disclosure.

Figure 5:
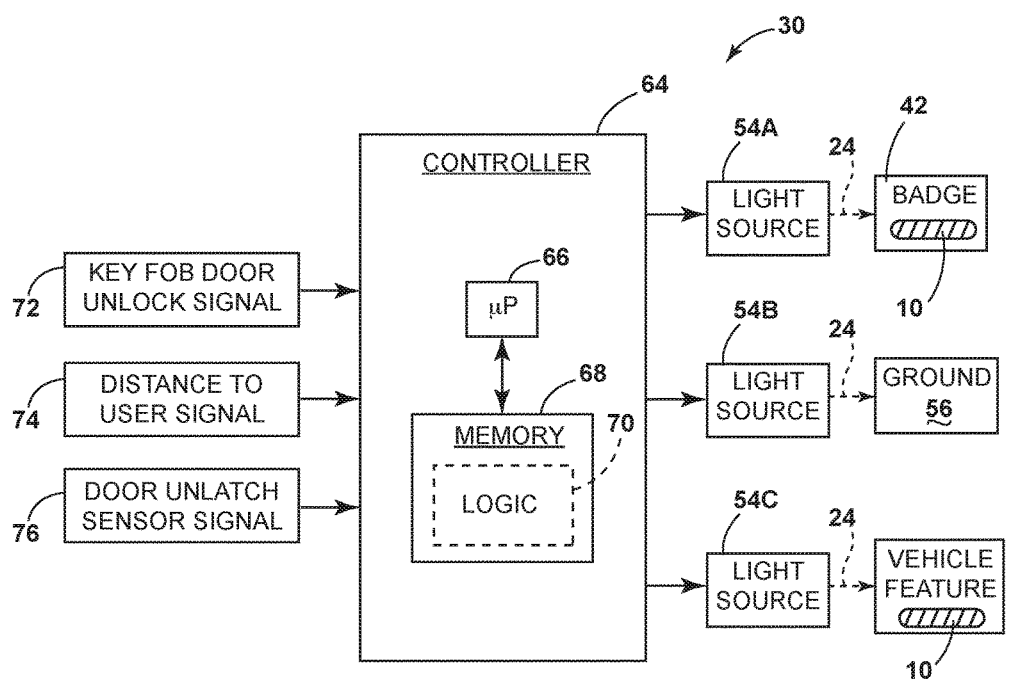
FIG. 5 is a block diagram further illustrating the lamp assembly, according to one embodiment.

Referring to FIG. 5, the lamp assembly 30 is further illustrated having a controller 64 receiving various inputs and controlling each of the light sources 54A, 54B, 54C, by applying signals to the light sources 54A, 54B, 54C. The controller 64 may include a microprocessor 66 and memory 68 as illustrated, according to one embodiment. It should be appreciated that the controller 64 may include control circuitry such as analog and/or digital control circuitry. Stored within memory 68 and executed by the microprocessor 66 is logic 70 for processing the various inputs and controlling each of the plurality of light sources 54A, 54B, 54C, as described herein. The inputs to the controller 64 may include a key fob 38 door unlock signal 72 which may be made available from another controller, e.g., body control module, within the vehicle 28 in communication with the key fob 38 via wireless communication.

Additionally, the controller 64 receives a distance to user signal 74 which is a distance that the user is detected from the vehicle 28. The distance to the user signal may be generated by computing distance between the vehicle 28 and the key fob 38, according to one embodiment. Additionally, or alternatively, the controller 64 may include one or more of wireless communication transceivers that may be configured to interact with an electronic device. The wireless communication transceivers may communicate with the electronic device over a wireless signal (e.g., radio frequency). In one non-limiting example, the wireless communication transceivers may be a Bluetooth™ RN4020 module, or an RN4020 Bluetooth™ low energy PICtail board configured to communicate with the electronic device using Bluetooth™ low energy signals. The wireless communication transceivers may include a transmitter and a receiver to transmit and receive wireless signals (e.g., Bluetooth™ signals) to and from the electronic device, to and from the lamp assembly 30 and/or to and from the vehicle 28. It will be appreciated that the wireless communication transceivers may utilize other forms of wireless communication between with the electronic device and other wireless communication transceivers such as Wi-Fi™.

Another controller 64 such as a vehicle body control module may supply the distance to user signal. According to other embodiments, the distance to the user signal could be generated using other sensors, such as an ultrasonic proximity sensor 40. The controller 64 further receives a door unlatch sensor signal 76. The door unlatch sensor signal may be a signal sensed by the proximity sensor 40 in the door handle 36, or may be a signal detected by activation of a sensor on the key fob 38.

The controller 64 processes the inputs and activates the lamp assembly 30 by turning the plurality of light sources 54A, 54B, 54C on and off based on the illumination of desired features and/or the ground surface 56 disposed proximately to the vehicle 28. The controller 64 may activate the lamp assembly 30 in response to other signals such as a door unlock signal generated by a door mounted switch or a door open signal, according to other embodiments. The lamp assembly 30 may be turned off when a predetermined time period expires or when a user is detected opening a vehicle door 34 via the door unlatch sensor signal 76, according to one embodiment. The controller 64 may further determine a distance from the vehicle 28 to a user and may control intensity and/or time of activation for each of the light sources 54A, 54B, 54C, according to other embodiments.

Referring still to FIG. 5, in operation, the photoluminescent structure 10 may exhibit a constant unicolor or multicolor illumination in response to receiving excitation light 24 from one or more of the light sources 54A, 54B, 54C. According to one embodiment, the photoluminescent structure may be disposed on and/or in the badge 42 and contain a long persistence photoluminescent material 18 therein. Accordingly, the badge 42 may luminesce in response to the excitation light 24 for long durations of time that may exceed one hour in some embodiments.

According to one embodiment, the controller 64 may prompt the one or more light sources 54A, 54B, 54C to emit only a first wavelength of excitation light 24 to cause the photoluminescent structure 10 to luminesce in the first color (e.g., blue). Alternatively, the controller 64 may prompt the one or more light sources 54A, 54B, 54C to emit only a second wavelength of excitation light 24 to cause the photoluminescent structure 10 to luminesce in the second color (e.g., white). Alternatively still, the controller 64 may prompt the one or more light sources 54A, 54B, 54C to simultaneously emit the first and second wavelengths of excitation light 24 to cause the photoluminescent structure 10 to luminesce in a third color defined by an additive light mixture of the first and second colors. Moreover, additional photoluminescent structures may be added to the lamp assembly 30 that convert the excitation light 24 emitted from the one or more light sources 54A, 54B, 54C to a different wavelength. Alternatively still, the controller 64 may prompt the one or more light sources 54A, 54B, 54C to alternate between periodically emitting the first and second wavelengths of excitation light 24 to cause the photoluminescent structure 10 to periodically illuminate by alternating between the first and second colors of converted light 26. The controller 64 may prompt the one or more light sources 54A, 54B, 54C to periodically emit the first and/or second wavelengths of excitation light 24 at a regular time interval and/or an irregular time interval.

With respect to the above examples, the controller 64 may modify the intensity of the emitted first and second wavelengths of excitation light 24 by pulse-width modulation or current control. In some embodiments, the controller 64 may be configured to adjust a color of the converted light 26 by sending control signals to adjust an intensity or energy output level of the one or more light sources 54A, 54B, 54C. For example, if the one or more light sources 54A, 54B, 54C is configured to output the excitation light 24 at a low level, substantially all of the excitation light 24 may be converted to the outputted, visible converted light 26. If the one or more light sources 54A, 54B, 54C is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 64 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the lamp assembly 30.

As described herein, the color of the converted light 26 may be significantly dependent on the particular photoluminescent material 18 utilized in the photoluminescent structure 10. Additionally, a conversion capacity of the photoluminescent structure 10 may be significantly dependent on a concentration of the photoluminescent materials 18 utilized in the photoluminescent structure 10. By adjusting the range of intensities that may be emitted from the one or more light sources 54A, 54B, 54C, the concentration and proportions of the photoluminescent materials 18 in the photoluminescent structure 10 and the types of photoluminescent materials 18 utilized in the photoluminescent structure 10 discussed herein may be operable to generate a range of color hues of outputted light by blending the excitation light 24 with the converted light 26. It is also contemplated that the intensity of each one or more light sources 54A, 54B, 54C may be varied simultaneously, or independently, from any number of other light sources 54A, 54B, 54C.

Figure 6:
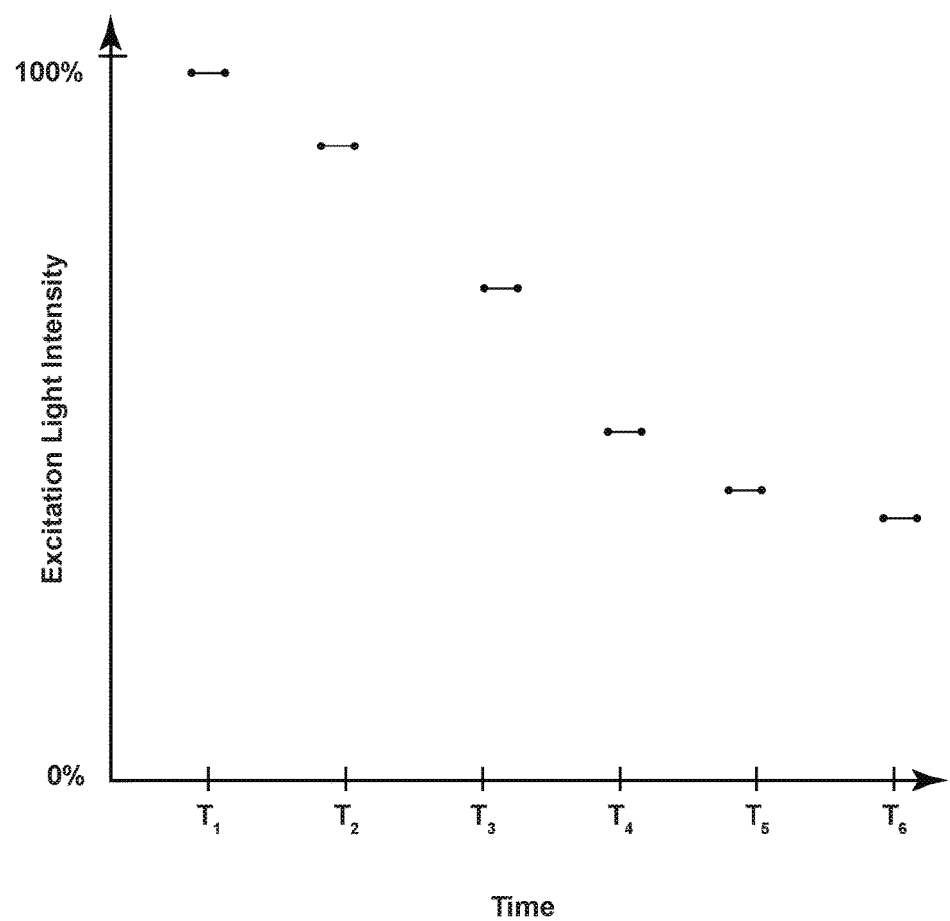
FIG. 6 is a graph illustrating the intermittent illumination of one or more light sources within the lamp assembly, according to one embodiment.

Referring to FIG. 6, once a vehicle engine is placed in an off state and/or the vehicle transmission is placed in a parked state, one or more of the light sources 54A, 54B, 54C within the lamp assembly 30 may emit intermittent emissions of excitation light 24 at predefined periods for re-exciting the photoluminescent structure such that the photoluminescent structures disposed on and/or with the vehicle 28 may luminesce. According to one embodiment, as the user remains away from the vehicle 28, the intensity of excitation light 24 emitted by the one or more light sources 54A, 54B, 54C may be varied. The intensity can increase or decrease while an occupant is away from the vehicle 28. For example, after an occupant is deemed to have left the vehicle 28, a first period of excitation light 24 may occur at a first time $T_1$ with an intensity close to 100 percent (100%). At a second period $T_2$, if the occupant remains away from the vehicle 28, the one or more light sources 54A, 54B, 54C may emit a second emission of excitation light 24 for a period of time that is at an intensity lower than the intensity emitted at $T_1$. Each progressive time period $T_3$, $T_4$, $T_5$, $T_n$, may emit a lesser intensity of light to cause the photoluminescent structure to luminesce.

The drop in intensity of excitation light 24 emitted may be linear, exponential, and/or asymptotic at a desired intensity level. The asymptotic level of emitted excitation light 24 may be determined based on the photoluminescent material disposed within the photoluminescent structure and the minimum intensity of excitation light 24 needed to cause the photoluminescent material to luminesce for a period of time after the removal of excitation light 24.

As described above, the controller 64 is operably coupled with the one or more light sources 54A, 54B, 54C. The controller 64 may also include a timer that may determine the subsequent illumination parameters of the one or more light sources 54A, 54B, 54C based on the previous illumination sequence, the duration of time since the vehicle engine was running, the duration of time since an occupant was proximate to the vehicle 28, etc. Based on the parameters detected by the controller 64, any sensors, and/or the timer, the controller 64 may determine the appropriate lighting sequence of the photoluminescent structure.

A lamp assembly 30, as described in reference to FIG. 6, may be used to continually and/or passively illuminate a feature of the vehicle 28, such as the badge 42. Through the variance of intensity of emitted excitation light 24, stored electrical power within the vehicle 28 may be preserved. Thus, according to one embodiment, by emitting excitation light 24 towards the photoluminescent structure at predefined intervals, the photoluminescent structure may luminesce for any period of time. In some embodiments, the photoluminescent structure may luminesce for more than twenty-four (24) hours. Accordingly, a long persistence photoluminescent material may be used within the photoluminescent structure to extend the duration of luminescence.

Figure 7:
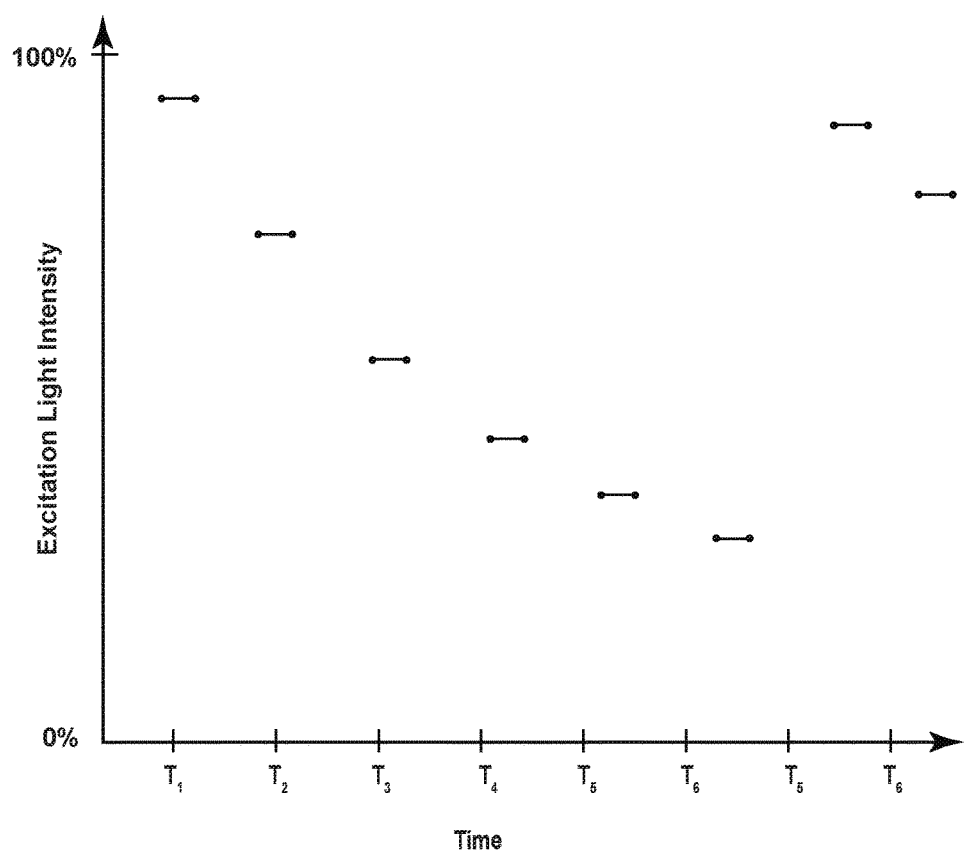
FIG. 7 is a graph illustrating an alternate embodiment of the lamp assembly illuminating at intermittent time periods, according to one embodiment.

Referring to FIG. 7, the controller 64 may store the average times that a vehicle occupant remains away from the vehicle 28 at different times. Based on the average away time, the one or more light sources 54A, 54B, 54C may raise the intensity of emitted excitation light 24 based on a predicted return time of the occupant.

As described above, the intensity of excitation light 24 emitted from the one or more light sources 54A, 54B, 54C may decline as the occupant remains away from the vehicle 28 as illustrated by the intensity of light emitted for predetermined times declining from $T_1$ to $T_6$. However, according to one embodiment, an occupant may leave the vehicle 28 around the same time each day. Accordingly, the one or more light sources 54A, 54B, 54C may raise the intensity of excitation light 24 emitted therefrom at a predetermined time period, $T_7$, such that the photoluminescent structure luminesces as the occupant approaches the vehicle 28. Once the higher intensity is emitted at $T_7$, the light intensity may then begin to decline until the controller 64 determines that the occupant is approaching the vehicle 28.

Accordingly, a lamp assembly for a vehicle has been advantageously described herein. The assembly may provide various benefits including a simple and cost-effective means to produce a variety of illumination features that may be used as a styling feature and/or to provide active and/or passive exterior lighting to the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lamp assembly, comprising:
first and second light sources disposed in a rearview mirror, wherein the first and second light sources emit light at varied wavelengths;
a badge disposed on a vehicle and operably coupled with the first light source; and
a photoluminescent structure disposed on the badge and configured to luminesce in response to receiving an excitation light emitted by the first light source.

2. The lamp assembly of claim 1, wherein the photoluminescent structure includes at least one photoluminescent material configured to convert an excitation light received from the first light source into a visible light.

3. The lamp assembly of claim 1, wherein the first photoluminescent structure includes a long persistent photoluminescent material therein.

4. The lamp assembly of claim 1, wherein the first light source emits light that is directed towards a portion of the vehicle and the second light source directs light towards a ground surface.

5. The lamp assembly of claim 1, wherein the first wavelength is within one of blue light, violet light, and UV light spectrums.

6. The lamp assembly of claim 1, wherein the first or second light sources emit excitation light as an occupant approaches the vehicle.

7. The lamp assembly of claim 1, wherein a controller in the vehicle stores an average away time of an occupant and the first light source emits the excitation light before the average away time expires if the vehicle determines that the vehicle is unoccupied.

8. A vehicle mirror assembly, comprising:
first and second light sources disposed within respective first and second housings in said vehicle mirror assembly, wherein a direction of illumination from the second light source is offset from the first light source; and
a vehicle badge having a first photoluminescent structure disposed therein and configured to luminesce in response to an excitation light emitted by the first light source.

9. The vehicle mirror assembly of claim 8, wherein the first photoluminescent structure includes a long persistent photoluminescent material therein.

10. The vehicle mirror assembly of claim 8, further comprising:
a second photoluminescent structure disposed on a second light source window forming a portion of the second housing.

11. The vehicle mirror assembly of claim 10, wherein the first photoluminescent structure and the second photoluminescent structure each comprise at least one photoluminescent material configured to convert an excitation light into a visible converted light.

12. The vehicle mirror assembly of claim 8, further comprising:
a first light source window operably coupled with the first light source and configured to allow the excitation light emitted form the first light source to pass therethrough.

13. The vehicle mirror assembly of claim 12, wherein the first light source window includes optics for directing excitation light emitted therefrom towards a desired location.

14. The vehicle mirror assembly of claim 9, wherein the first light source intermittently emits the excitation light towards the feature when a vehicle is in an off state.

15. A vehicle lamp assembly, comprising:
a light source disposed on a vehicle rearview mirror;
a vehicle badge operably coupled with the light source; and
a photoluminescent structure disposed on the vehicle badge and configured to luminesce in response to receiving an excitation light from the light source, wherein the light source emits intermittent emissions of the excitation light at the badge when the vehicle is in a parked state.

16. The vehicle lamp assembly of claim 15, wherein the intermittent emission of the excitation light excites the photoluminescent structure such that the feature may continually luminesce.

17. The vehicle lamp assembly of claim 15, wherein sequential intermittent emissions of excitation light are at lower intensity levels than a previous emission.

18. The vehicle lamp assembly of claim 15, wherein a controller within the vehicle stores an average away time of an occupant from a vehicle and increase the intensity of the intermittent emissions when the average time is about to expire.

19. The vehicle lamp assembly of claim 15, wherein a time period between the intermittent emissions expands as the vehicle remains in a parked state.

20. The vehicle lamp assembly of claim 19, wherein the intensity of the excitation light emitted from the light source increases as an occupant approaches the vehicle.

\* \* \* \* \*